(12) United States Patent
Nguyen et al.

(10) Patent No.: US 8,307,977 B2
(45) Date of Patent: Nov. 13, 2012

(54) VESSEL CONVEYING DEVICE SEPARATING A MAIN VESSEL FLOW INTO A PLURALITY OF SECONDARY FLOWS

(75) Inventors: Daniel Nguyen, Octeville sur Mer (FR); Stephane Morin, Octeville sur Mer (FR); Pierre-Francois Langlois, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 307 days.

(21) Appl. No.: 12/671,363

(22) PCT Filed: Jul. 30, 2008

(86) PCT No.: PCT/FR2008/051439
§ 371 (c)(1),
(2), (4) Date: Jan. 29, 2010

(87) PCT Pub. No.: WO2009/024715
PCT Pub. Date: Feb. 26, 2009

(65) Prior Publication Data
US 2010/0200367 A1    Aug. 12, 2010

(30) Foreign Application Priority Data
Aug. 1, 2007    (FR) ...................................... 07 05631

(51) Int. Cl.
*B65G 47/84* (2006.01)
(52) U.S. Cl. ................ 198/803.9; 198/470.1; 198/803.3
(58) Field of Classification Search ............... 198/470.1, 198/478.1, 803.3, 803.9, 811, 955; 406/87
See application file for complete search history.

(56) References Cited

U.S. PATENT DOCUMENTS

| | | | | |
|---|---|---|---|---|
| 5,607,045 A | * | 3/1997 | Hermann Kronseder | . 198/476.1 |
| 6,302,172 B1 | * | 10/2001 | De Villele | 141/372 |
| 6,354,427 B1 | * | 3/2002 | Pickel et al. | 198/470.1 |
| 6,494,646 B1 | * | 12/2002 | Sala | 406/88 |
| 6,520,318 B1 | * | 2/2003 | Humele | 198/483.1 |
| 6,796,342 B2 | * | 9/2004 | De Antoni Migliorati et al. | 141/165 |
| 7,565,961 B2 | * | 7/2009 | Fiegler | 198/478.1 |
| 7,681,713 B2 | * | 3/2010 | Nishi et al. | 198/470.1 |
| 7,686,564 B2 | | 3/2010 | Kaiser et al. | |
| 7,748,518 B2 | * | 7/2010 | Hollriegl et al. | 198/470.1 |
| 7,784,603 B2 | * | 8/2010 | Burgmeier | 198/472.1 |
| 7,849,998 B2 | * | 12/2010 | Langlois et al. | 198/803.9 |

FOREIGN PATENT DOCUMENTS

| | | |
|---|---|---|
| FR | 2781470 A1 | 1/2000 |
| FR | 2801045 A1 | 5/2001 |
| WO | 2005/037685 A2 | 4/2005 |

* cited by examiner

*Primary Examiner* — Douglas Hess
(74) *Attorney, Agent, or Firm* — Sughrue Mion, PLLC

(57) ABSTRACT

The invention relates to a device for conveying vessels of the bottle type, characterized in that it comprises: a primary wheel for conveying the bottles including a plurality of transfer arms; at least two secondary conveying wheels respectively capable of conveying the bottles fed by the primary wheel; the conveying path of the bottles grasped by the clamps of the transfer arms of each secondary wheel being at one point tangential to the conveying path of the bottles grasped by the transfer arms of the primary wheel, whereby the main flow of bottles conveyed by the primary wheel is divided into at least two secondary flows of bottles respectively conveyed by the secondary conveying wheels.

12 Claims, 5 Drawing Sheets

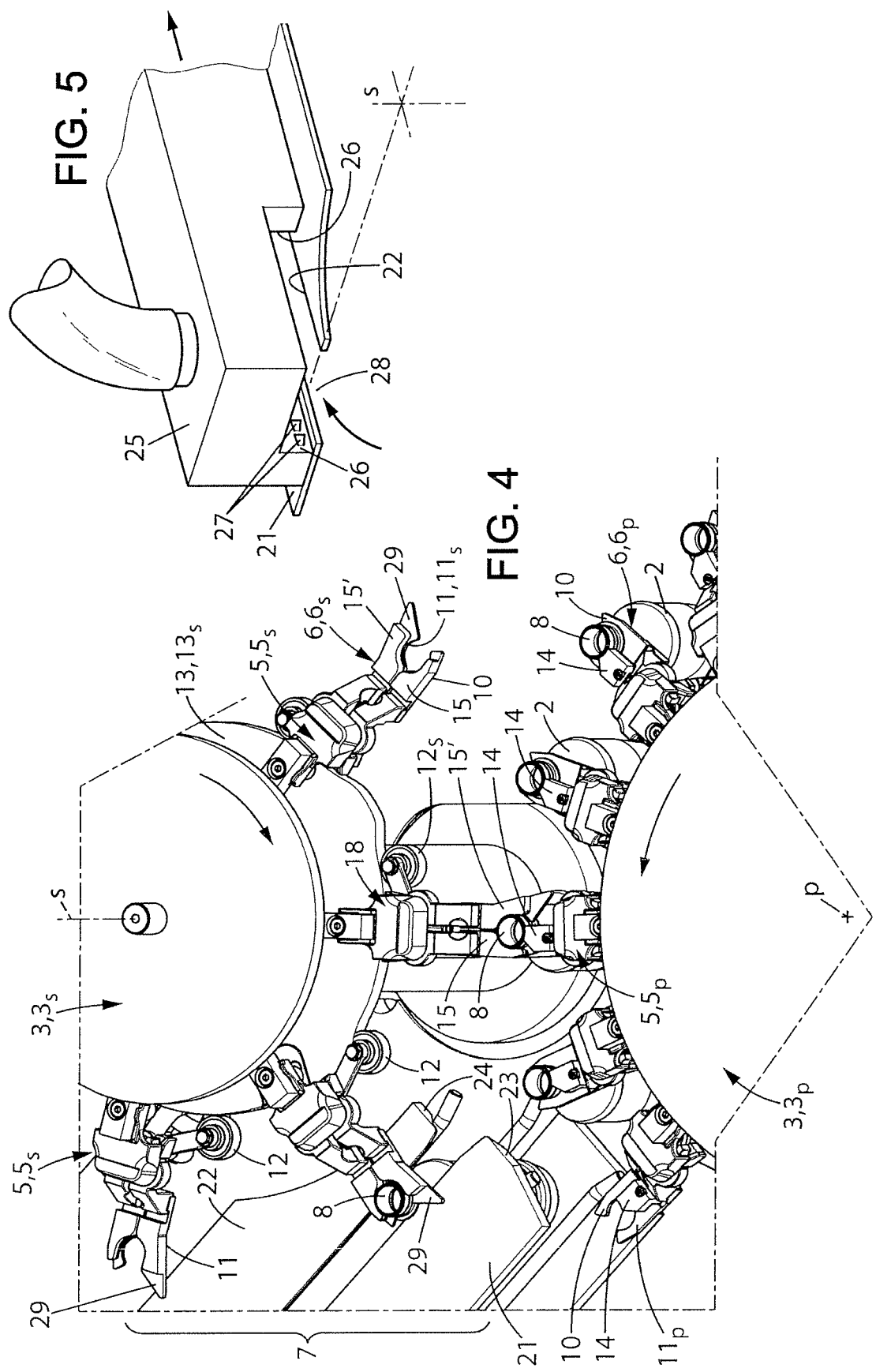

VESSEL CONVEYING DEVICE SEPARATING A MAIN VESSEL FLOW INTO A PLURALITY OF SECONDARY FLOWS

FIELD OF THE DESCRIPTION

The present invention relates to a device for conveying vessels of the bottle type, for separating a main vessel flow, fed at the outlet of an upstream vessel processing machine, into a plurality of secondary vessel flows respectively intended for a plurality of machines located downstream.

The invention more specifically applies to the conveying of blown vessels, such as bottles, at the outlet of a circular blowing conveyor consisting of a plurality of blowing stations arranged at the periphery thereof.

After the blowing operation at the outlet of the circular blowing conveyor, the blown bottles must be conveyed to other processing machines such as, for example, filling machines or palletisers for the transport thereof to another site.

DESCRIPTION OF THE PRIOR ART

In view of the production rates of blowing machines, it is necessary to separate the flow at the outlet of such a machine to, in particular, prevent bottle jamming problems in the routing conveyors and, in some instances, enable continuous feeding of downstream processing machines, which have a lower production rate.

One embodiment of a device for separating and conveying vessels of the bottle type is described in the document FR2801045. However, this device also comprises portions for guiding the bottles, at the neck thereof, which are liable to cause incidents due to friction.

A further embodiment, described in the document WO2005037685, discloses, as part of a palletising installation, a system for separating a bottle flow from a blowing machine. This system comprises an unloading wheel which is associated with the blowing machine to handle the bottles formed. This unloading wheel then feeds the bottles to one or two conveyors, depending on the case, of the endless chain type, equipped with clamps, said conveyors in turn feeding a plurality of intermediate wheels which place the bottles at the entry of belt conveyors or pneumatic conveyors.

In this installation, the unloading wheel and the various intermediate wheels grasp the bottles by the body, i.e. on a portion of the bottle that has just been moulded as the bottle is coming from the blowing machine. This portion of the bottle, the body, is relatively soft; it does not represent a very precise reference zone for bottle transfers and, in particular, for transfers to chain conveyors equipped with clamps which grasp the bottles by the neck in the tamperproof ring reception zone situated between the rim and the threaded part of said neck.

Furthermore, for this installation, it is not easy to switch rapidly from one type of bottle to another, i.e. convey a plurality of types of bottles wherein the bodies have different formats and dimensional characteristics (for example switching from a vessel with a capacity of one litre to a vessel with a capacity of two litres).

SUMMARY OF THE INVENTION

Therefore, the present invention proposes to solve the problems of the prior art associated with this type of bottle flow processing, using a precise and original conveying device not requiring any intervention or adjustment particularly in relation to the dimensional characteristics of the body of the bottle or vessel.

The conveying system according to the invention also makes it possible to simplify the bottle circuit and ensure the reliability of this bottle transfer between the blowing machine outlet and the final conveyors. Indeed, this transfer, which is performed at high speed, induces, on the bottles, an oscillation movement associated with the centrifugation thereof, said movement tending to degrade the precision of the position of the neck of said bottles in relation to the grasping clamps and cause incidents during the transfer of said bottles.

In order to remedy these oscillation problems, the invention also proposes a specific arrangement of the clamp systems, at the bottle grasping arms thereof.

Similarly, the final transfer of the bottles to pneumatic conveyor type or other routing members also requires particular care as the bottles are switched from a transfer system where they are trapped by their supporting member in the form of clamps to a conveying system where they are relatively free, merely guided under the rim thereof or propelled, at the neck thereof, by a blast of air from directional ports provided in the walls of a caisson supplied with compressed air, as described, for example, in the document FR2781470.

Therefore, switching from a positive holding system to a relative holding conveying system also requires some specific arrangements on the clamps to switch between these conveying systems with precision and with all the efficiency required.

According to a first aspect, the present invention relates to a device for conveying and transferring, using clamps, bottle type vessels, between, for example, a feeding member and conveyor type routing members, said device comprising:

a primary entry wheel rotated and equipped with clamps which are supported by arms arranged in a star pattern, transfer means situated between said primary entry wheel and said routing members, said means also being provided with flat clamps wherein the tangential speed is equivalent to that of said clamps of said primary wheel, said primary entry wheel comprising a plurality of groups of flat clamps grasping the bottles under the rim, on the ring situated directly below said rim, and each group of clamps being associated with a control mechanism to open and close said clamps in a synchronised manner, with means for holding said bottles at said feeding member and said clamps of said transfer means.

said transfer means consisting of a plurality of secondary wheels, the number of which corresponds to the number of groups of clamps distributed on said primary entry wheel, each secondary wheel comprising:—clamps, which are also supported by arms arranged in a star pattern on a plate, and—a mechanism for controlling said clamps to open and close same in a synchronised manner with the opening and closure of the corresponding clamps of said primary wheel and the handling means arranged on the routing members.

The device according to the invention operates with clamps which are in contact with a specific portion of the bottle, i.e. the zone consisting of the neck, rim and ring situated directly below said rim. This zone of the bottle is a durable and stable portion common to a large number of bottles. It makes it possible to ensure the reliability of the bottle transfer operations, particularly for these operations for separating an initial bottle flow into a plurality of flows, said operating requiring very high precision.

According to the invention, the control means of the clamps of the various wheels consist of rollers suitable for following a cam groove formed on the periphery of a fixed plate which is centred on the axis of the corresponding primary or secondary wheel.

Again according to the invention, the primary entry wheel is associated with a plurality of stacked plates comprising the cam groove for manoeuvring the clamps, each plate being associated with a group of clamps to open and close said clamps in a synchronised manner with the means for holding the bottles on the feeding member and the clamps of the various secondary wheels.

According to a further arrangement of the invention, the clamps of the various wheels comprise, provided on at least one of the arms thereof, adjustment means extending along the height of the neck of the bottles to hold the axis of said neck in a precise position, parallel with the axis of said wheels and these means are arranged in a complementary manner to be able to engage about said neck and impede the oscillation movement of the bottles resulting from the centrifugation thereof.

Again according to the invention, for the clamps of the primary entry wheel, the neck adjustment means consist of an abutment arranged on the inner portion of the upstream arm of the clamps, said abutment being formed to mould at least one portion of the outer contour of the upper portion of said neck so as to provide same with clearly separate vertical supports and so as to create a type of embedding of said neck in said assembly consisting of both arms of the clamp and said abutment.

Again according to the invention, for the clamps of the secondary wheels, both arms of said clamps each comprise, on the top thereof, an additional thickness formed to mould a portion of the outer upper contour of the neck and form, in the active holding position, a type of U-shaped jaw which partially encloses said upper portion of the neck, said arms, with said additional thicknesses, also creating a type of embedding which impedes the oscillation of the bottles and immobilises same during the transfer thereof between wheels or from a wheel to any routing member.

According to a further arrangement of the invention, in the case of a transfer to a pneumatic conveyor type routing member, for example, the downstream arm of the clamps of the feed wheels of said member comprises an extension in the form of a flat catch, said catch being arranged to guide and push the neck of the bottle into the entry of said pneumatic conveyor, so as to propel same in the zone of the conveyor where it is handled effectively by the pulsed air flow from the ports of the caissons wherein the compressed air circulates.

In order to enable the transfer of the bottles to a plurality of processing stations, such as labelling machines or palletisers, the conveying and distribution device according to the invention comprises a number of pneumatic conveyors equivalent to the number of groups of clamps distributed on the primary entry wheel, and to the number of secondary wheels.

Alternatively, to enable greater separation of a main bottle flow at the outlet of a blowing machine, for example, the conveying and distribution device according to the invention comprises a plurality of stages for separating said main flow:
  a first separation stage situated downstream from the feeding member and comprising a main entry wheel which distributes the bottles to a first series of primary wheels,
  a plurality of second separation stages each situated at the outlet of each primary wheel of said first series and consisting of secondary wheels feeding the various bottle routing members.

According to a second aspect thereof, the present invention relates to a method for conveying bottles for separating a main bottle flow into a plurality of secondary bottle flows, said method comprising at least the following steps:
  grasping of the bottles from the routing member, said grasping being performed from below the rim thereof, on the ring-shaped zone situated directly below said rim, by means of clamps borne by arms arranged in a star pattern on a rotating primary entry wheel;
  transfer of the groups of bottles grasped by said primary wheel to clamps arranged at the end of transfer arms borne by the secondary conveying wheels, said clamps of said secondary wheels grasping the bottles above the rim thereof, on the ring-shaped zone situated between said rim and the threading provided on the neck;
  and transfer of each group of bottles to a suitable pneumatic conveyor type routing member, for example, which handles the bottles under said rim between guides.

BRIEF DESCRIPTION OF THE DRAWINGS

The present invention is now described using merely illustrative and in no way limitative examples of the scope of the invention, based on the following figures, wherein:

FIG. 4 is an enlarged perspective view showing the operation consisting of transferring a bottle from one clamp to another and the introduction of the bottle into the entry of a pneumatic type conveyor which is represented in the compressed air propulsion system thereof;

FIG. 5 shows the entry of a pneumatic type conveyor suitable for receiving bottles conveyed by the clamps of the secondary wheel;

DETAILED DESCRIPTION OF THE INVENTION

Figure 1:
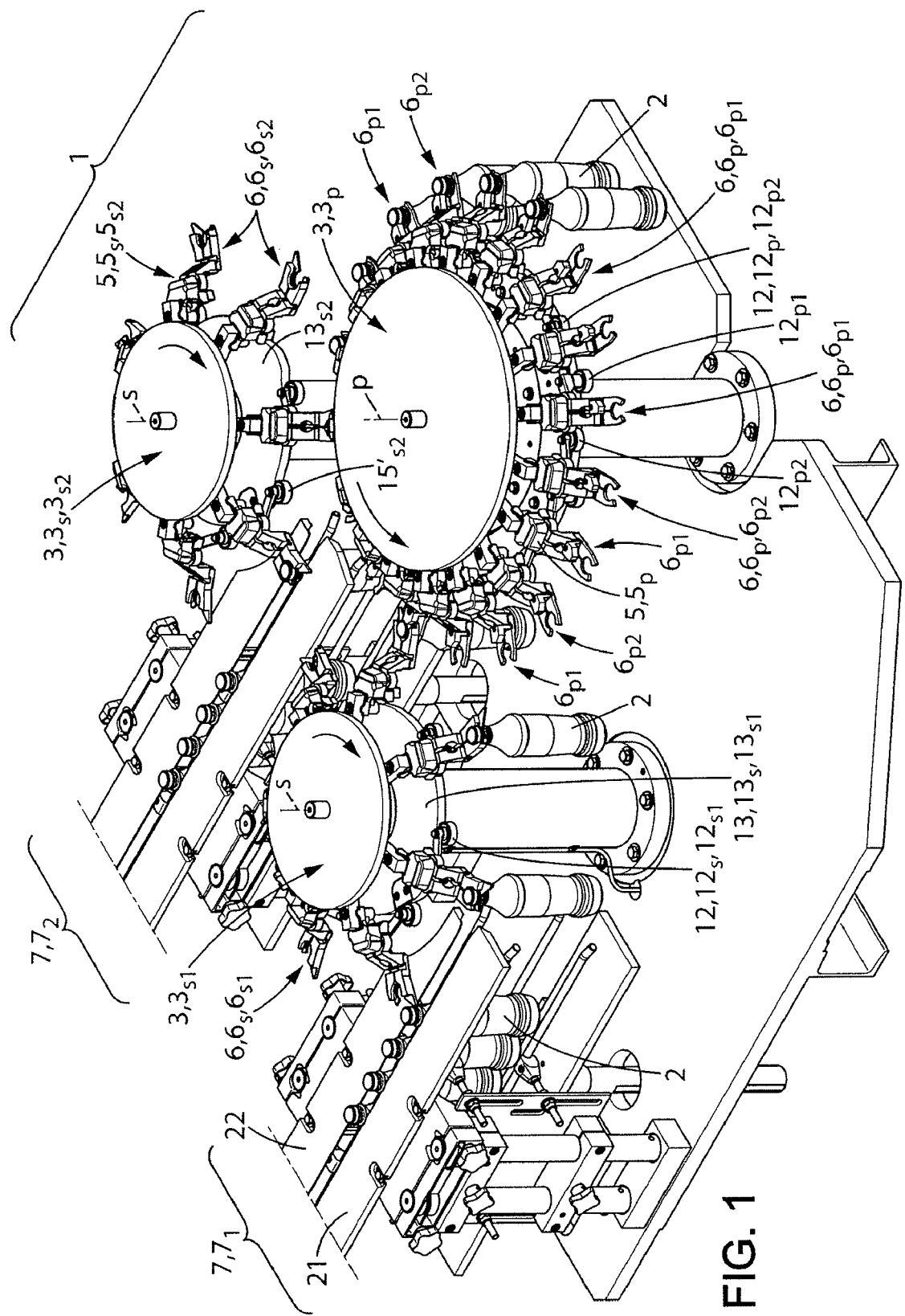
FIG. 1 is a perspective view of an embodiment of the bottle conveying and distribution devices according to the invention for separating a main bottle flow conveyed by a primary wheel into two secondary bottle flows.

FIG. 1 represents a perspective view of a first embodiment of a device 1 for conveying and transferring vessels of the bottle type 2, said device comprising a plurality of wheels 3 rotated in a synchronised manner, similar to gears.

This device 1 comprises a first wheel hereinafter referred to as the primary conveying wheel 3$p$. This wheel 3$p$ has a substantially vertical axis of rotation and is fed tangentially by a feeding member 4, represented by a single arrow, said member 4 being, for example, connected to means for unloading a blowing machine not shown. The primary wheel 3$p$ transfers and tangentially feeds, in turn, a plurality of wheels 3 hereinafter referred to as secondary wheels 3$s$, always in the case of a flow separation device, as represented in FIG. 1.

These various wheels 3 are presented, for example, in the form of a circular plate at the periphery whereof arms 5 are attached at regular intervals in a star pattern. They are rotated, in a synchronised manner, by motor and driving means known per se and not shown in the figures.

Each arm 5 is equipped with a clamp 6 which engages with manoeuvring means to grasp, transfer and release the bottle when it is handled.

In the example shown in FIG. 1, the final handling of the bottles 2 conveyed by the secondary wheels 3s is also performed tangentially by conveyor type routing members 7 and in particular, as detailed hereinafter with reference to FIG. 4, pneumatic type conveyors 7.

Therefore, this conveying device 1 can convert a primary bottle flow 2, for example from a blowing machine, into a plurality of bottle flows, two, three or more according to dimensional capabilities, to feed machines for preparing said bottles at lower rates.

To create this separation of the primary flow, the device 1 comprises a primary wheel 3p comprising a number of groups of clamps 6 corresponding to the number of secondary wheels 3s to be fed and each secondary wheel 3s feeds a routing member 7 directly.

The device 1 represented in FIG. 1 comprises a primary wheel 3p and two secondary wheels 3s; a first secondary wheel 3s1 feeds one conveyor 7.1 and the second secondary wheel 3s2 feeds another conveyor 7.2.

In fact, the number of groups of clamps 6p1 and 6p2, on the primary wheel 3p, is equivalent to the number of conveyors 7 to be fed.

The number of clamps 6p1 on the primary wheel 3p and the number of clamps 6s arranged on the secondary wheels 3s are in particular determined according to the space available, on the installation site, to accommodate the various wheels.

The pairs of wheels 3p-3s operate in a manner similar to gears; they operate with strictly identical circumferential speeds on the tangent point thereof to obtain perfect synchronisation on each of the clamp pairs where one clamp releases the bottles at the very moment the other grasps said bottle.

The various wheels are driven, for example, by means of a chain or toothed belt transmission.

Figure 3:
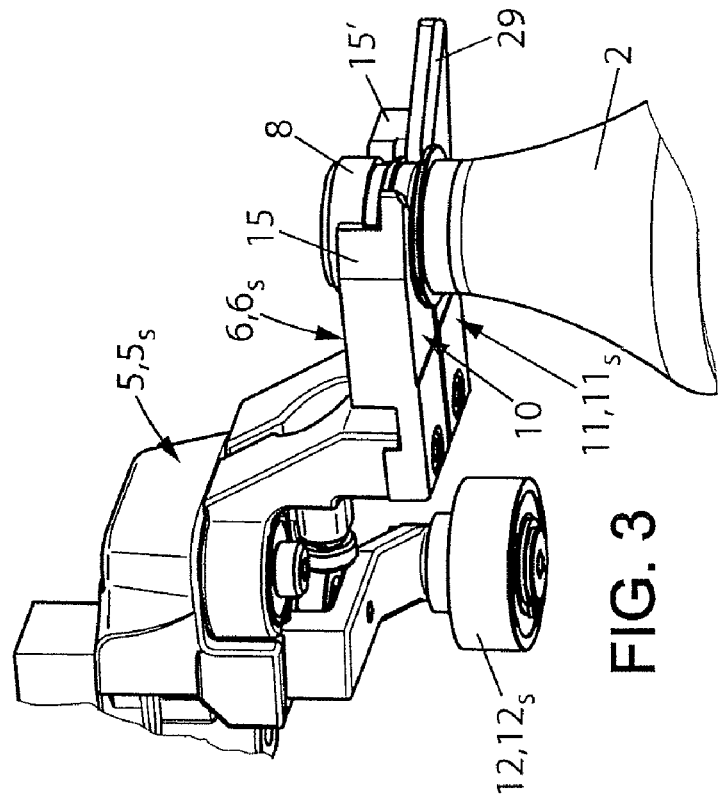
FIG. 3 is also a partial perspective view of an embodiment of an arm provided with a clamp, fitted on the various secondary wheels, wherein said clamp handles the bottle conveyed by the clamp of the primary wheel.
Figure 2:
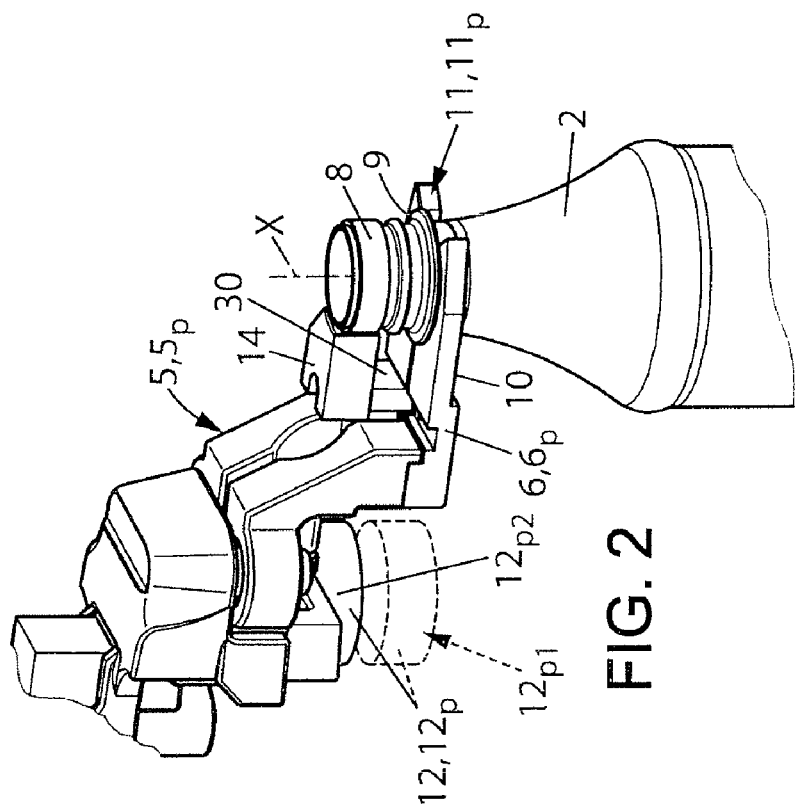
FIG. 2 is a partial perspective view of an embodiment of an arm provided with a clamp, mounted on the primary wheel, for transferring a bottle to another clamp.

FIGS. 2 and 3 show a detailed illustration of both clamp systems 6 which are used to create these transfers; these two clamp systems are produced differently since, as detailed hereinafter, one is arranged to grasp the bottle 2 under the rim thereof and the other to grasp same above said rim.

Commonly, the bottle 2 comprises an upper portion consisting of a neck 8 and, situated at the base of said neck 8, a rim 9. On either side of said rim 9, a ring-shaped zone is found, capable of engaging with the arms of a flat clamp.

Each clamp 6 conventionally consists of two hinged arms 10 and 11, wherein the ends are arranged in the form of jaws to enclose the bottle 2. These two arms 10 and 11 are manoeuvred simultaneously by a control system comprising a roller 12 engaging with a cam groove, said roller 12 being attached at the end of a lever arm suitable for pivoting and triggering the separation and approach by pivoting of the two arms 10, 11.

The roller 12 is suitable for moving on a cam groove provided on the outer periphery of a plate 13 which is fixed; said plate is detailed hereinafter with reference to the appropriate figures. This plate 13 is centred on the axis of the wheel 3p or 3s with which it is associated and is arranged substantially parallel with the rotating plate of these wheels 3p and 3s whereon the transfer arms 5 and clamps 6 are attached.

Alternatively, it is also possible to provide the cam groove on an inner periphery of the fixed plate 13.

The bottles 2 are grasped by the jaws of the arms 10 and 11, said jaws being in the form of a thin piece. To improve the hold of the bottles 2 during the transfer thereof, the arms 10 and 11 comprise additional adjustment means detailed hereinafter.

In FIG. 2, illustrating the clamp system 6 of the primary wheel 3p, the presence of two rollers 12 is noted; one is represented by a solid line and the other by dotted lines.

Figure 6:
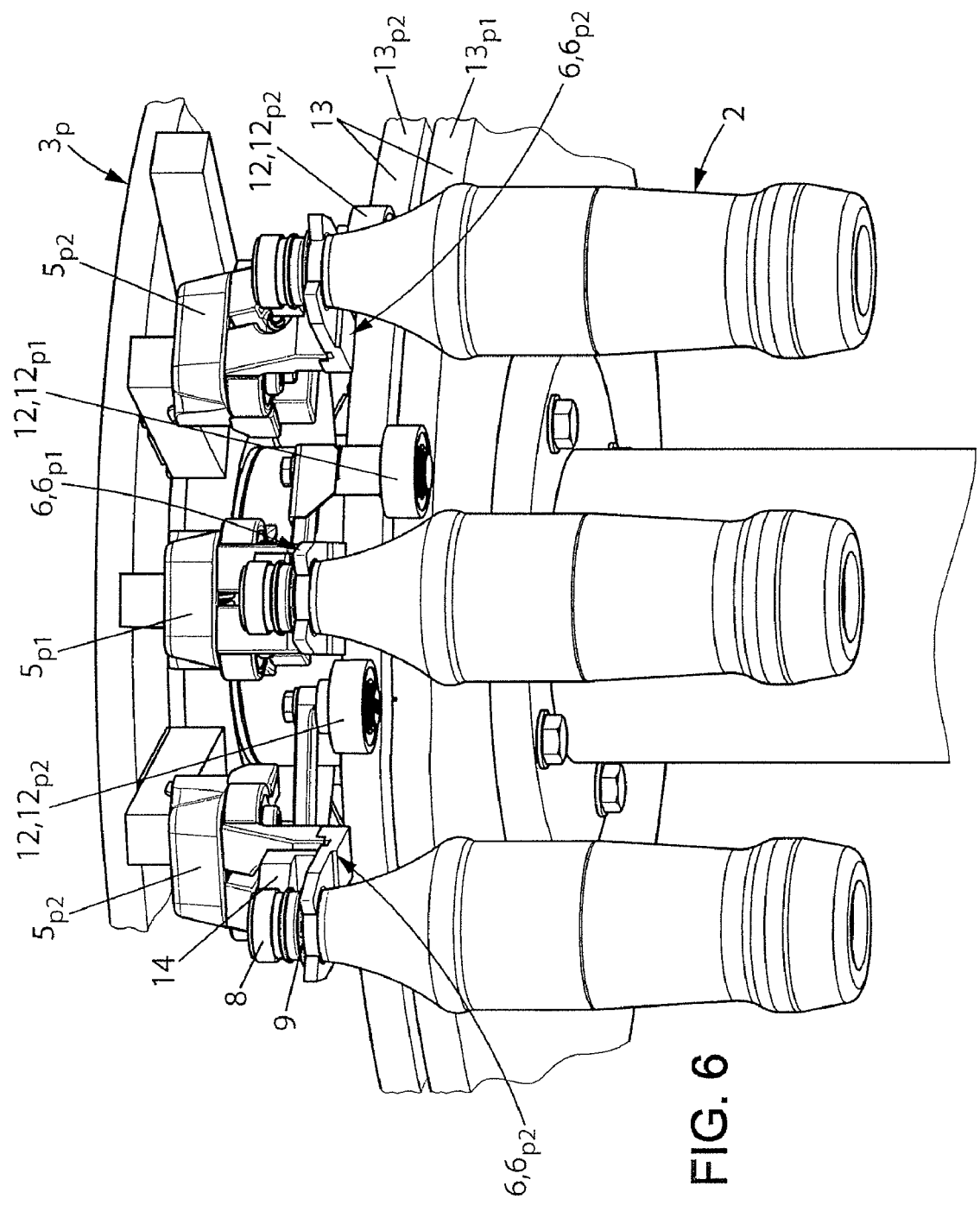
FIG. 6 is a larger scale detailed view of a portion of FIG. 1 showing, in particular, the control cams of each group of clamps.

The roller 12p1, represented by dotted lines, is associated with one of the groups of clamps, the clamps 6p1 seen in FIGS. 1 and 6 in particular, whereas the other roller 12p2, represented by a solid line, is associated with the group of clamps 6p2.

The additional adjustment means of the bottles 2 previously mentioned, are arranged on one of the arms of the clamp 6p and in particular on the arm 11p, i.e. the arm which is upstream in accordance with the direction of rotation of the wheel 3p. These adjustment means consist of an abutment 14 situated towards the centre of the wheel 3p in relation to the orifice for positioning the bottle 2 in the clamp 6p; this abutment 14 is in contact with the upper portion of the neck 8, i.e. with the portion tending to move towards the centre of said wheel 3p under the effect of the centrifugation of the bottle 2 during the transfer thereof.

This abutment 14 projects towards the neck 8, above the arm 11, leaving a gap between the abutment and the top of said arm, and the active contact surface thereof with the neck 8 is formed in the form of a portion of a cylinder so as to cover approximately ⅙ to ⅛ of the upper portion of the periphery of said neck 8.

Due to the presence of this abutment 14, the neck 8 of the bottle 2 is held firmly by the clamps 6 of the transfer arms 5 in a substantially vertical direction and is therefore not subject to tilting or pivoting movements during the conveying and transfer thereof between wheels.

Similarly, for the same reasons, adjustment means are arranged on the clamp 6s, represented in FIG. 3, and in particular on each arm 10 and 11. These adjustment means are presented in the form of two jaws 15, 15' formed on additional thickness on each arm 10 and 11 respectively, to enclose the upper portion of the neck 8. These jaws 15, 15' enclose the neck 8 over at least half of the circumference thereof and form a type of U in the active position, about said neck.

During the tangential alignment of the clamps 6p and 6s, the abutment 14 and the jaws 15, 15' are engaged about the neck 8 with a sufficient clearance to avoid any interference between said clamps.

FIG. 4 illustrates this engagement of the adjustment means which is arranged on the clamps 6p and 6s. At the precise moment when the bottle 2 is in the alignment of the axes P and S of the wheels 3p and 3s, respectively, the bottle is taken in the jaws of the arms 10 and 11 of each clamp 6p, 6s, respectively below and above the rim 9 thereof and the neck 8 is adjusted in a type of cage consisting of the abutment 14 and the jaws 15 and 15'.

FIG. 4 also illustrates the plate 13s the outer periphery whereof forms the cam groove of the roller 12s for manoeuvring the arms of the corresponding clamp 6s at the right time. This plate 13s is fixed and is centred on the axis S of the wheel 3s.

The profile of the cam is arranged to enable the handling of the bottles 2 conveyed by the primary wheel 3p and the release of the bottles at the entry of the routing member which is associated with the wheel 3s, said routing member consists, for example, of a pneumatic conveyor 7.

This pneumatic conveyor is shown, in FIG. 4, without the compressed air supply caisson for propelling the bottles 2; this caisson is represented on its own, separately, in FIG. 5.

The bottles 2 are conveyed by the clamps 6s to the entry of the conveyor 7 by the clamps 6s. This pneumatic conveyor 7 consists of two rails 21 and 22 for guiding the bottle 2 under the neck, i.e. the bottle rests on the two rails 21 and 22 by means of the rim 9 thereof and is guided to the zone situated below said rim 9 which is presented in the form of ring wherein the diameter is equivalent to the diameter of the neck 8.

The rail 21 is situated somewhat on the outside in relation to the rail 22 which is situated on the side of the wheel 3s. This rail 21 has an entry 23 situated upstream from the entry 24 of the inner rail 22. The entry 24 is situated substantially on a radius of the wheel 3s and this radius is perpendicular to the guiding rails 21 and 22, as represented in FIG. 5.

Also in FIG. 5, the arrangement of the caisson 25 wherein the compressed air circulates makes it possible to convey the bottles. This pneumatic conveying system is detailed in the document FR2781470 mentioned above; it comprises side walls 26 between which the neck 8 of the bottles 2 passes. These walls 26 comprise a multitude of ports 27 separated in said walls 26 to form an air flow oriented in the direction of movement of the cylinders 2.

The bottles 2 carried by the clamps 6s enter a slot 28 provided at the entry of the caisson 25 to enable the passage of said clamps 6s.

In this entry of the caisson 25, the bottles 2 are not immediately subjected to the entire air flow responsible for routing same to other stations and/or other machines. Also, to extend the effect of guiding of the bottles 2 by the clamps 6s, the latter comprise, arranged at the end of the downstream arm 11s thereof, an extension in the form of a catch 29, particularly represented in FIGS. 3 and 4. This catch 29 is cut obliquely; viewed from above, it forms a triangle positioned at the end of the arm 11p and the outside thereof extends from the outside of said arm 11s. It guides and gives a final impetus to the neck 8 and to the bottle 2 to help same reach the entry of the passage formed by both walls 26.

To avoid any interference between the catch 29 and the stop 14 which is positioned on the arm 11p of the clamps 6p, a gap 30 between said abutment 14 and said arm 11p is provided, which can be seen in FIG. 2 in particular.

The movement speed of the bottles in the conveyors 7 is markedly less than the speed of the bottles at the outlet of the blowing machine. The reduction factor is dependent on the number of conveyors 7 and thus the number of groups of clamps 6p situated on the primary wheel 3p.

FIG. 1 illustrates an example of separation of the speed into two between the inlet and the outlet of the conveying device 1. This embodiment is also represented in a more detailed manner, on a larger scale, in FIG. 6, to illustrate the primary wheel 3p with the two groups of bottles 2 thereof, along with the two sets of clamps 6p and the means for controlling and manoeuvring said clamps 6p.

The two groups of bottles 2 are distributed on the wheel 3p and the clamps 6p are divided into two sets of clamps as specified above:—a first set of clamps 6p1 and—a second set of clamps 6p2; said sets are arranged in a star pattern and are angularly offset, with the same number of clamps 6p each.

The first set of clamps 6p1, in FIG. 6, is associated with a plate 13p1 wherein the periphery is arranged in the form of a cam in order to manoeuvre the various clamps by means of the roller 12p1. The profile of the cam makes it possible to handle one out of two bottles from those conveyed by the feeding member 4 and to release same when handled by the corresponding clamp 6s of the secondary wheel 3s.

Similarly, the second set of clamps 6p2 operates with a plate 13p2 wherein the periphery is provided with a cam profile to manoeuvre the various clamps 6p2 and handle every other bottle from those conveyed by the feeding member 4 and subsequently release the bottles 2 in the suitable conveyor 7.

As a general rule, the present invention also relates to a method for conveying vessels enabling the separation of a main flow of bottles 2 into a plurality of secondary flows of bottles 2, the method according to the invention comprising at least the following steps:

grasping of the bottles 2 by the clamps 6 of the transfer arms 5 of a primary conveying wheel 3p;

transfer of a portion of the bottles 2 grasped by the primary conveying wheel 3p to clamps 6 supported by transfer arms 5 of a secondary conveying wheel 3s;

transfer of a further portion of the bottles 2 grasped by the primary conveying wheel 3p to clamps supported by transfer arms 5 of a further secondary conveying wheel 15.

More specifically, the method according to the invention comprises the following steps:

grasping of the bottles 2 at the outlet of an assembly for feeding a flow of bottles, such as a bottle blowing machine or a transfer arm conveying wheel, by a plurality of clamps 6p supported by transfer arms 5p attached on a primary conveying wheel 3p;

closure of a clamp 6s supported by a transfer arm 5s belonging to first secondary conveying wheel 3s on a bottle 2 held by a clamp 6p of a transfer atm 5p of the primary wheel 3p, and opening of said primary clamp 6p, whereby the bottle 2 is grasped by the clamp 6s of the first secondary wheel 3s and a portion of the flow of bottles 2 conveyed by the primary wheel 3p can thus be transferred to the first secondary wheel 3s;

closure of a clamp 6s of a transfer arm 5s belonging to a second secondary conveying wheel 3s on a bottle 2 held by a clamp 6p of a transfer arm 5p of the primary conveying wheel 3p, and opening of said clamp 6p of said transfer arm 5p of the primary wheel 3p, whereby the bottle 2 is grasped by the clamp 6s of the transfer arm 5s of the second secondary wheel 3s and a portion of the flow of bottles 2 conveyed by the primary wheel 3p can thus be transferred to the second secondary wheel 3s.

In this way, if it is desired to separate the bottles conveyed by the secondary wheels 3s further, the method according to the invention further comprises a partial transfer step of the flow of bottles conveyed by at least one of the conveying wheels 3 to another conveying wheel.

Alternatively, if it is desired to no longer separate the flow of bottles conveyed by the secondary wheels 3s, the method according to the invention may comprise a transfer step of the bottles grasped by at least one secondary wheel to a pneumatic conveyor 7.

Preferentially, the method comprises a step for the rigid connection of a clamp 6p of the transfer arm 5 on at least one bottle 2 conveyed having a rim 9 either by grasping the bottle below the rim 9 thereof, or by grasping the neck 8 of the vessel 2 above the rim 9.

Additionally, the method comprises a step for controlling the opening and closure of the radial end in the form of a clamp 6 of the transfer arms 5 via the bearing of a roller 12 belonging to the transfer arm 5 on a cam groove formed on the outer periphery of a fixed plate 13 arranged below the wheel 3.

Figure 7:
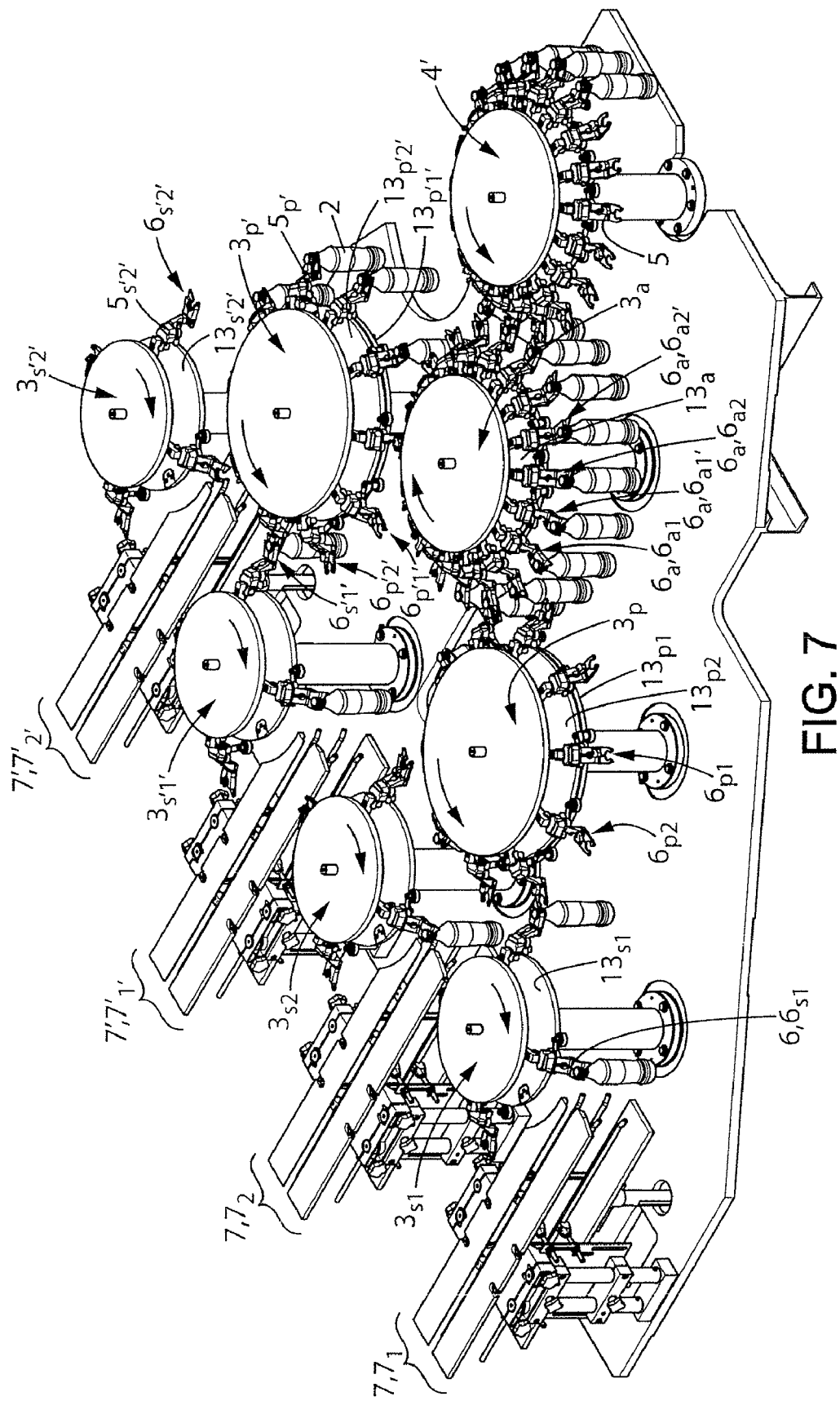
FIG. 7 is a perspective view of an additional embodiment of the bottle conveying and distribution device according to the invention for separating a main bottle flow into four secondary bottle flows.

FIG. 7 represents a perspective view of a device applying the general principle of the invention and enabling the separation of a main flow of bottles 2 into four secondary flows.

According to this embodiment, a main wheel 3*a* is provided which is suitable for grasping the bottles 2 at the outlet of an upstream conveying wheel 4' and transferring the bottles 2 to two other primary wheels 3*p*, 3*p*' (as is the case for the embodiment illustrated in FIG. 1).

In addition to the first embodiment illustrated in FIG. 1, two pairs of two downstream conveying wheels 3*s* 1, 3*s*2 and 3*s*'1, 3*s*'2 are also provided, each pair of wheels 3*s*1, 3*s*2 and 3*s*'1, 3*s*'2 being suitable for grasping the bottles grasped by one of the two primary wheels 3*p*, 3*p*', whereby the flow of bottles 2 grasped by each primary wheel 3*p*, 3*p*' is in turn separated into two secondary flows.

The various groups of bottles 2 grasped by these pairs of downstream conveying wheels 3*s*1, 3*s*2 and 3*s*'1, 3*s*'2 are then respectively for each of these downstream wheels 3*s*1, 3*s*2 and 3*s*'1, 3*s*'2 transferred respectively into a air conveyor 7.1, 7.2 and 7'.1, 7'.2, of the type described in FIG. 1.

Alternatively, it is possible to insert, instead of the air conveyors 7, 7', other pairs of transfer arm conveying wheels for a further separation of the flow of bottles 2 grasped by the downstream conveying wheel 3*s*1, 3*s*2 and 3*s*'1, 3*s*'2, which would result in the formation of eight secondary flows.

So that the grasped bottles 2 are transferred into the air conveyors 7, 7' with the rim 8 thereof suitable for resting on the rails 21, 22 for guiding said conveyors 7, 7', it is necessary for the conveying wheels 3*s*1, 3*s*2, 3*s*'1, 3*s*'2 distributing the bottles 2 to the conveyor to have transfer arms 5 of the type represented in FIG. 3, i.e. with grasping of the bottle 2 by the neck 8 thereof, so as to be able to place the rim 9 on the guiding rails 21, 22.

For this reason, it is necessary for the primary wheels 3*p*, 3*p*' to have transfer arms 5 of the type illustrated in FIG. 2, i.e. with grasping of the vessel 2 below the rim 9, and, consequently, for the main wheel 3*a* to have transfer arms 5 of the type illustrated in FIG. 3, i.e. with grasping of the bottle 2 by the neck 8 thereof In this way, given that the bottles 2 at the blowing machine outlet cannot be grasped from below the rim 9 thereof, it is then necessary to add a conveying wheel 4' upstream from the main wheel 3*a* for grasping the bottles 2 from below the rim 9. The upstream conveying wheel 4' thus has transfer arms 5 of the type illustrated in FIG. 2.

Furthermore, according to this embodiment, it can be noted that the primary wheels 3*p*, 3*p*' have two fixed plates 13*p*1, 13*p*2 and 13*p*'1, 13*p*'2, defining two cam grooves for the rollers of the clamps supported by the transfer aims 5 for controlling said transfer arms 5 for a transfer of the bottles 2 either to a first wheel 3*s* or to a second downstream wheel 3*s*.

The invention claimed is:

1. Device for conveying vessels of the bottle type, using clamps, between a feeding member and routing members, of the type comprising:
   a primary entry wheel rotated and equipped with clamps which are supported by arms arranged in a star pattern,
   transfer means situated between said primary entry wheel and said routing members, said means also being provided with flat clamps,
   wherein said device comprises a primary wheel comprising a plurality of groups of flat clamps grasping said bottles under the rim thereof, each group of clamps being associated with a dedicated control mechanism to open and close said clamps in a synchronized manner, with means for holding said bottles at said feeding member and said clamps of said transfer means, and
   wherein said transfer means comprises a plurality of secondary wheels, the number of which corresponds to the number of groups of clamps distributed on said primary wheel, each secondary wheel comprising:
   clamps, having a tangential speed equivalent to that of said clamps of said primary wheel which are also supported by arms arranged in a star pattern on a plate, and
   a mechanism for controlling said clamps to open and close same in a synchronized manner with the opening and closure of the corresponding clamps of said primary wheel and handling means arranged on said routing members in the form of conveyors.

2. Device for conveying bottle type vessels, according to claim 1, wherein the control means of the clamps of the various wheels comprise rollers suitable for following a cam groove formed on the periphery of a fixed plate which is centered on the axis of the corresponding wheel.

3. Device for conveying bottle type vessels, according to claim 2, wherein the primary wheel is associated with a plurality of stacked cam plates, each plate being associated with a group of clamps to open and close said clamps in a synchronized manner with the means for holding said bottles on the feeding member and the clamps of the various secondary wheels.

4. Device for conveying bottle type vessels, according to claim 1, wherein the clamps of the various wheels comprise, provided on at least one of the arms thereof, adjustment means extending along the height of the neck of said bottles to hold the axis of said neck and said bottle in a position which is parallel with the axis of said wheels, said adjustment means being arranged in a complementary manner to be able to engage about said neck.

5. Device for conveying bottle type vessels, according to claim 4, wherein said device comprises, for the clamps of the primary wheel, a neck adjustment means comprising an abutment arranged on an inner portion of an upstream arm of the clamps, said abutment being formed above said arm to mould at least one portion of an outer contour of an upper portion of said neck.

6. Device for conveying bottle type vessels, according to claim 5, wherein, for the clamps of the secondary wheels, both arms of said clamps each comprise, on the top thereof, an additional thickness in the form of jaws formed to mould a portion of the outer upper contour of the neck.

7. Device for conveying bottle type vessels, according to claim 4, wherein, for the clamps of the secondary wheels, both arms of said clamps each comprise, on the top thereof, an additional thickness in the form of jaws formed to mould a portion of the outer upper contour of the neck.

8. Device for conveying bottle type vessels, according claim 1, wherein, in the case of a transfer to a pneumatic conveyor type conveyor, the clamps of the secondary wheels for feeding said conveyor present a downstream arm, said downstream arm comprising an extension in the form of a flat catch, said catch being arranged to guide and push the neck of the bottle into the entry of said conveyor, so as to propel same in the zone of said conveyor where said bottle is handled effectively by a compressed air flow from ports provided in side walls of caissons wherein the compressed air circulates.

9. Device for conveying bottle type vessels, according to claim 8, wherein said device comprises a number of pneumatic conveyors equivalent to the number of groups of clamps distributed on the primary wheel, and to the number of secondary wheels.

10. Device for conveying bottle type vessels, according to claim 1, wherein said device comprises a plurality of stages for separating the main flow of bottles:

a first separation stage situated downstream from the feeding member and comprising a main entry wheel which distributes said bottles to a first series of primary wheels, a plurality of second separation stages each situated at the outlet of each primary wheel and comprising secondary wheels feeding the various conveyor type members for routing said bottles.

11. Method for conveying bottle type vessels for separating a main bottle flow into a plurality of secondary bottle flows, comprising at least the following steps:

grasping of said bottles from a feeding member, said grasping being performed from below the rim of said bottles, by means of a plurality of groups of clamps borne by arms arranged in a star pattern on a rotating primary wheel, each group of clamps associated with a dedicated control mechanism to open and close said clamps in a synchronized manner;

transfer of the groups of bottles grasped by said primary wheel to clamps arranged at the end of transfer arms borne by the secondary conveying wheels, said clamps grasping said bottles above the rim thereof, and transfer of each group of bottles to a suitable pneumatic conveyor type routing member, which handles said bottles under said rim.

12. A device for conveying bottles using clamps, between a feeding member and routing members, comprising:

a primary wheel equipped with clamps supported by arms arranged in a star pattern;

a transfer mechanism between the primary entry wheel and the routing members, the transfer mechanism provided with clamps arranged in a star pattern;

wherein the clamps of the primary wheel comprise groups of clamps configured to grasp the bottles, each group of clamps associated with a dedicated control mechanism to open and close the clamps in a synchronized manner; and wherein said transfer mechanism comprises a number of secondary wheels, the number of which corresponds to the number of groups of clamps distributed on the primary wheel, each secondary wheel comprising:

clamps having a tangential speed synchronized to a tangential speed of corresponding ones of the clamps of the primary wheel; and a mechanism for controlling the clamps of the secondary wheels to open and close in a synchronized manner with an opening and closing of the corresponding ones of the clamps of the primary wheel;

the secondary wheels selectively separating and routing the bottles to a plurality of handling conveyors downstream of the primary wheel and the transfer mechanism.

* * * * *